United States Patent
Zimmermann et al.

(10) Patent No.: US 12,197,620 B2
(45) Date of Patent: Jan. 14, 2025

(54) METHODS AND SYSTEMS FOR MANAGING PERSONAL DATA ASSOCIATED WITH IMAGE PROCESSING

(71) Applicant: Robert Bosch GmbH, Stuttgart (DE)

(72) Inventors: Christian Zimmermann, Stuttgart (DE); Sven Trieflinger, Renningen (DE); Betül Durak, Redmond, WA (US); Stefan Gehrer, Pittsburgh, PA (US)

(73) Assignee: Robert Bosch GmbH (DE)

( * ) Notice: Subject to any disclaimer, the term of this patent is extended or adjusted under 35 U.S.C. 154(b) by 310 days.

(21) Appl. No.: 17/734,664

(22) Filed: May 2, 2022

(65) Prior Publication Data

US 2023/0351041 A1    Nov. 2, 2023

(51) Int. Cl.
*G06F 21/62* (2013.01)
*G06F 21/60* (2013.01)
*G06V 20/52* (2022.01)

(52) U.S. Cl.
CPC ........ *G06F 21/6245* (2013.01); *G06F 21/602* (2013.01); *G06V 20/52* (2022.01)

(58) Field of Classification Search
CPC .... G06F 21/602; G06F 21/6245; G06V 20/52
See application file for complete search history.

(56) References Cited

U.S. PATENT DOCUMENTS

| | | | | |
|---|---|---|---|---|
| 2014/0068777 A1* | 3/2014 | Piratla | ................. | G06F 21/60 726/26 |
| 2020/0307614 A1* | 10/2020 | Jordan | ................. | H04W 4/12 |
| 2021/0133357 A1 | 5/2021 | Machani et al. | | |
| 2021/0409199 A1* | 12/2021 | Tsirkin | ................. | G06F 9/45558 |
| 2022/0021660 A1 | 1/2022 | Trieflinger et al. | | |
| 2022/0078209 A1* | 3/2022 | V | ............................ | H04L 63/105 |
| 2022/0335153 A1* | 10/2022 | Herman | ................. | G06N 3/094 |

OTHER PUBLICATIONS

Zhang, Wei, Sen-Ching S. Cheung, and Minghua Chen. "Hiding privacy information in video surveillance system." IEEE International Conference on Image Processing 2005. vol. 3. IEEE, 2005. (Year: 2005).*
NPL Search Terms (Year: 2024).*
Wolf et al., "Face Recognition in Unconstrained Videos with Matched Background Similarity," CVPR 2011, pp. 529-534.

(Continued)

*Primary Examiner* — Syed A Zaidi
(74) *Attorney, Agent, or Firm* — Dickinson Wright PLLC (57) ABSTRACT

Methods and systems for securely managing personal data associated with image processing include an image sensor configured to capture an image, a local computer system local to the image sensor, and a backend computer system remote from the image sensor. The local computer system has a processor with a trusted execution environment (TEE) that detects anomalies in images from the image sensor, extracts personal data from the image, and encrypts the personal data. The local computer system then sends the extracted, encrypted personal data to the backend computer system, where a backend TEE decrypts the extracted, encrypted personal data, and performs data processing by comparing the decrypted personal data to other personal data that is stored in a backend database in the backend computer system.

20 Claims, 4 Drawing Sheets

(56) References Cited

OTHER PUBLICATIONS

Saligrama et al., "Video Anomaly Detection Based on Local Statistical Aggregates," IEEE Conference on Computer Vision and Pattern Recognition, 2012, pp. 2112-2119.

Feiten et al., "Revocable Anonymisation in Video Surveillance: A 'Digital Cloak of Invisibility'," 12th IFIP International Conference on Human Choice and Computers (HCC), Sep. 2016, Salford, United Kingdom, 14 Pages.

Website https://www.intel.de/content/www/de/de/architecture-and-technology/software-guard-extensions.html, Retrieved from the WayBack Machine Apr. 19, 2022, Dated Mar. 30, 2022, 10 Pages.

Website https://www.edgeless.systems/edgeless-db, Retrieved from the WayBack Machine Apr. 19, 2022, Dated Apr. 16, 2021, 3 Pages.

Mohassel et al., "ABY3: A Mixed Protocol Framework for Machine Learning," Proceedings of the 2018 ACM SIGSAC Conference on Computer and Communications Security, New York, NY, USA, 40 pages.

ARM, "Arm Security Technology—Building a Secure System usingTrustZone Technology," Industry Whitepaper 2005-2009, 108 pages.

Damgård et al., "Confidential Benchmarking Based on Multiparty Computation," Lecture Notes in Computer Science May 2017, 18 pages.

Shamir., "How to Share a Secret," Communications of the ACM Nov. 1979, vol. 22, pp. 612-613.

Damgård et al., "Practical Covertly Secure MPC for Dishonest Majority—Or: Breaking the SPDZ Limits," ESORICS 2013, LNCS 8134, Berlin, 18 Pages.

Viola et al., "Rapid Object Detection using a Boosted Cascade of Simple Features," Proceedings of the 2001 IEEE Computer Society Conference on Computer Vision and Pattern Recognition. CVPR 2001, 9 Pages.

Songhori et al., "TinyGarble: Highly Compressed and Scalable Sequential Garbled Circuits," IEEE Symposium on Security and Privacy 2015, pp. 411-423.

Bogdanov et al., "Sharemind: A Framework for Fast Privacy-Preserving Computations," ESORICS 2008, LNCS 5283, pp. 192-206.

Redmon et al., "You Only Look Once: Unified, Real-Time Object Detection," 2016 IEEE Conference on Computer Vision and Pattern Recognition (CVPR), 10 Pages.

Rescorla et al., "The Transport Layer Security (TLS) Protocol Version 1.3," Aug. 2018, ISSN: 2070-1721, 160 pages.

Website https://www.intel.com/content/www/us/en/architecture-and-technology/software-guard-extensions.html, "Intel Software Guard Extensions (Intel SGX," Downloaded: Apr. 6, 2021, 6 pages.

* cited by examiner

METHODS AND SYSTEMS FOR MANAGING PERSONAL DATA ASSOCIATED WITH IMAGE PROCESSING

TECHNICAL FIELD

This disclosure relates to methods and systems for managing personal data associated with image processing. In some particular embodiments, this disclosure relates to detecting anomalies in images, and locally extracting and encrypting personal data associated with the image.

BACKGROUND

Private and/or public (e.g., government) entities may desire to use data gathered by cameras and the like for a variety of purposes. In some instances, this data may contain personal data such as personally identifiable information (PII). Improper handling of this data may violate local, regional, or global privacy laws—such as General Data Protection Regulation (GDPR) or the California Consumer Privacy Act (CCPA).

SUMMARY

According to an embodiment, a computerized method of managing personal data associated with image processing comprises capturing an image of an individual via an image sensor; detecting an anomaly in the image via a local computer system local to the image sensor; in response to the anomaly being detected, extracting personal data from the image via the local computer system; establishing a secure connection between the local computer system and a backend computer system; encrypting the personal data via the local computer system to produce encrypted personal data at the local computer system; transmitting the encrypted personal data to the backend computer system via the secure connection; decrypting the encrypted personal data via the backend computer system to produce decrypted personal data at the backend computer system; and performing, via the backend computer system, data processing based on a comparison of the decrypted personal data and stored personal data stored in the backend computer system.

According to another embodiment, a system of managing personal data associated with image processing includes an image sensor configured to capture an image; a local computer system local to the image sensor, the local computer system including a processor having a first trusted execution environment (TEE) programmed to (i) detect an anomaly in the image, and (ii) in response to detecting the anomaly, extracting personal data from the image to yield extracted personal data; and a backend computer system remote from the image sensor, the backend computer system including a database of stored personal data coupled to a processor having a second trusted execution environment (TEE) configured to (i) receive the extracted personal data, and (ii) perform data processing based on a comparison of the extracted personal data and the stored personal data.

According to yet another embodiment, a computer system configured to manage personal data associated with image processing is provided. The computer system includes an image sensor configured to capture an image; a database remote from the image sensor and storing stored personal data; a first processor local to the image sensor and having a first trusted execution environment (TEE) programmed to: receive image data corresponding to the image captured by the image sensor, detect an anomaly in the image data, in response to detecting the anomaly, extract personal data from the image, and encrypt the extracted personal data with a key; and a second processor remote from the image sensor and coupled to the database, the second processor having a second trusted execution environment (TEE) programmed to: decrypt the encrypted personal data with the key from the first TEE, and perform data processing based on a comparison of the decrypted personal data and the stored personal data.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This disclosure includes a description of "personal data." The term "personal data" may refer to one or more of the following: any information relating to an identified or identifiable natural person; an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person. Personally identifiable information (PII) is a non-limiting example of personal data. A natural person may refer to an individual human being having his or her own legal personality (whereas e.g., a legal person herein may refer to an individual human being, a private organization (e.g., a business entity or a non-governmental organization), or public organization (e.g., a government entity)). Thus, for example, personal data may refer to address information associated with a specific identified or identifiable natural person, neighborhood or locality information associated with a specific identified or identifiable natural person, an address number associated with the at least one identified or identifiable natural person, biometric information (e.g., fingerprints, DNA, retina and facial images, walking gate, etc.) associated with a specific identified or identifiable natural person, physical features of the at least one identified or identifiable natural person, vehicle information (e.g., license plate information) associated with a specific identified or identifiable natural person, image data or video data associated with a specific identified or identifiable natural person (e.g., wherein video data comprises a sequence of images), or the like.

Such personal data may be captured by one or more sensors. Non-limiting examples of sensors include: a light detection and ranging (lidar) sensor, a digital camera sensor (e.g., detecting light in and around the visible spectrum), an infrared camera, a short-, medium-, or long-range thermal imaging sensor, a milli-meter radar sensor, a sonar sensor (e.g., an ultrasonic sensor), distance sensor for producing range imaging, motion sensor, thermal imaging camera, or any other type of sensor that produces associated data that can include personal data. References to an "input image" or "image sensor" herein is not necessarily from a camera, but can be from any of the above-listed sensors. For example, the output of a sonar sensor can be processed to produce a visible image of an object, and thus the sonar sensor is an image sensor.

Video surveillance systems can be used for anomaly detection, e.g., the detection of unusual, abnormal, or nonstandard behavior. This may include the presence of individuals or unusual objects in locations where such presence may be unusual or unwanted. A classic example is the detection of a person in an unauthorized area, such as the surrounding area of a residential or commercial building. However, these systems are typically not equipped to determine how to handle a detected abnormal behavior. In other words, these systems may not be configured to decide whether an anomaly should be ignored due to the identity of the individual behaving abnormally. A video surveillance system might be more useful if it raises an alert in response to an unknown person entering a surveilled area, but not if the person entering the area is known (and authorized) by the system. Therefore, the identity of the person as detected by the surveillance sensor may be critical in deciding whether an alert should be generated.

Facial recognition can help solve this problem. For example, facial recognition can be used to determine the identity of the person detected by the surveillance sensor. However, facial recognition systems can be controversial and can pose privacy and security problems, particularly if the databases containing the private or personal information are centrally managed and/or are accessible via a network such as the Internet. Storage of large amounts of personal data requires strong security; anomaly detection systems using facial recognition should fulfil strict privacy requirements.

Therefore, according to various embodiments disclosed herein, a data privacy system and associated methods of operating the system are disclosed. The data privacy system includes a local computer system and a backend computer system. The local computer system can generate image data utilizing an image sensor such as a camera, and transfer this image data directly to a secure and trusted portion of the local processor (e.g., a trusted execution environment, TEE). The local TEE can then locally detect anomalies in the image data (e.g., movement a person being sensed by the sensor). If there is a detected anomaly, the personal data can be extracted locally by the TEE, and encrypted by the TEE using a key that allows decryption of the image data only within the backend computer system (e.g., a TEE within the backend computer system). The backend computer system (e.g., the backend TEE) will then decrypt and compare the extracted personal data with the stored personal data stored in the database to see if there is a match. If there is no match, the backend computer system may raise or issue an alert regarding the detection of an anomaly. If there is a match, other prescribed actions can be taken, such as the backend computer system comparing the detected anomaly to a prescribed set of rules.

References to "local" and "backend" computer systems refer to the relationship with the image sensor. A local computer system includes a processor (and optional TEE) directly connected with (e.g., on-board, within the same structural unit as, etc.) the image sensor. The images captured are sent directly to a processor within the local computer system, rather than through external communications (e.g., long range, wireless, Internet, etc.). In contrast, the "backend" computer system is physically remote from the sensor, and receives the image data through a secured wired and/or wireless connection with the local computer system.

Figure 1:
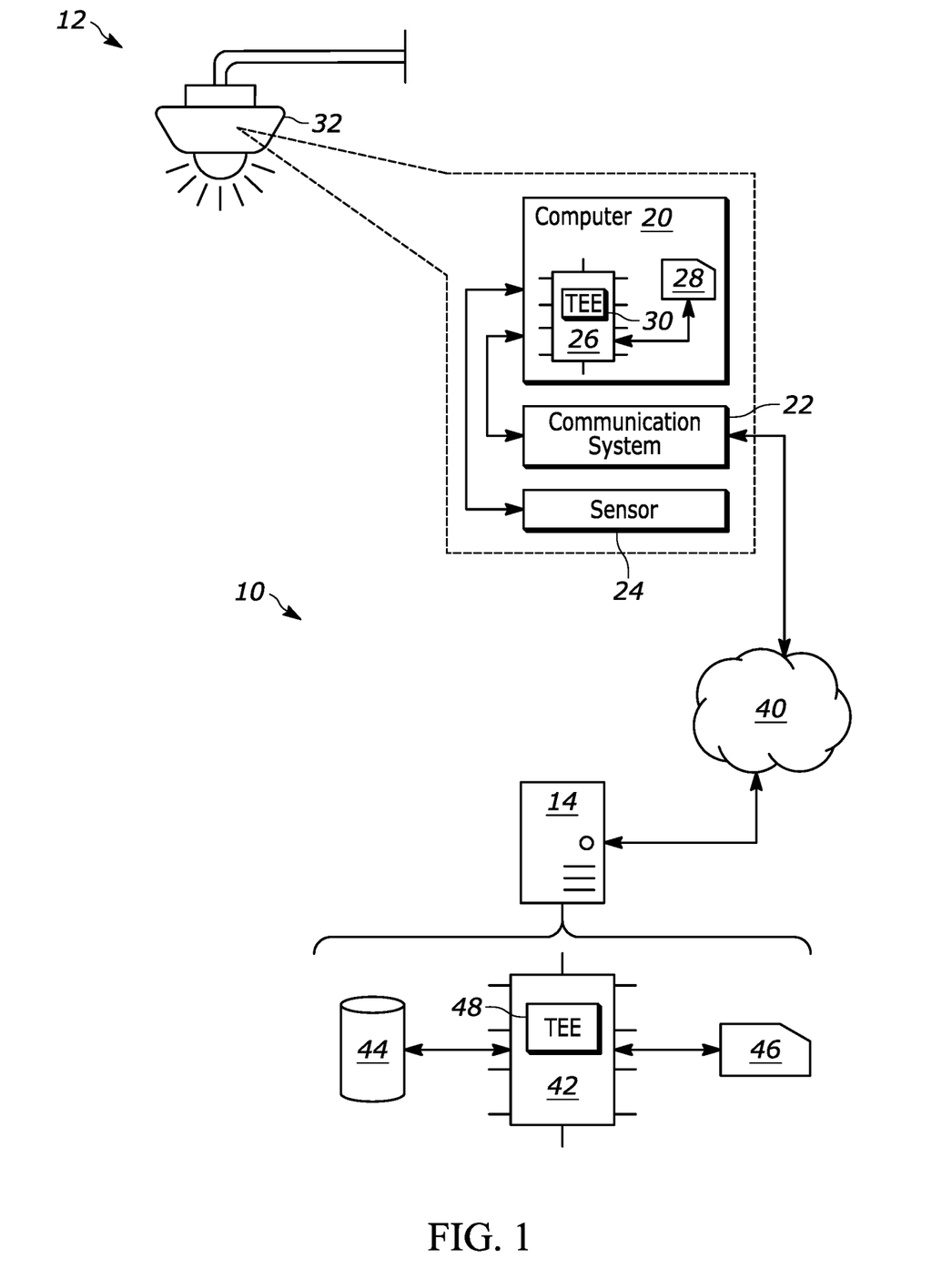
FIG. 1 is a schematic diagram illustrating an example of a data privacy system including a local computer system that collects and protects data, and a backend computer system that receives some of the data and further protects the data.

Turning now to the Figures, wherein like reference numerals indicate like or similar functions or features, a data privacy system 10 is shown that may comprise a local computer system 12 (also referred to as a data collection system) in communication with a backend computer system 14 (also referred to as an additional data protection system). Here, one backend computer system is shown; however, more or fewer may be used instead. The data privacy system 10 is configured to perform the steps disclosed herein, with the local computer system 12 and backend computer system 14 each having their own specific role in protecting the personal data that may be collected.

Referring to FIG. 1, the local computer system 12 may include, among other things, a computer 20, a communication system 22, and one or more sensors 24. The computer 20 may facilitate the collection of unsegregated data, some processing of the data, and the communication of that data to the backend computer system 14. The computer 20 may comprise one or more processors 26 and memory 28. The processor 26 may include a trusted execution environment (TEE) 30 as will be further described below.

The computer 20, communication system 22, and sensor 24 may collectively be referred to as a local computer system 12, or data generation system. The physical outlay or arrangement of the computer 20, communication system 22, and sensor 24 can vary, but are all local to one another. For example, they can be housed within a single, common housing 32.

The processors 26 may refer to one processor or multiple processors, and may be any suitable device that controls sensor(s) 24 and/or communication system 22. Processor(s) 26 may be programmed to process and/or execute digital instructions to carry out at least some of the tasks described herein. Non-limiting examples of processor(s) 26 include one or more of: a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc. —just to name a few. In at least one example, processor(s) 26 is configured to read from memory 28 and/or and execute multiple sets of instructions which may be embodied as a computer program product stored on a non-transitory computer-readable storage medium (e.g., such as memory 28). Some non-limiting examples of instructions are described in the processes below and illustrated in the drawings. These and other instructions may be executed in any suitable sequence unless otherwise stated. The instructions and the example processes described below are merely embodiments and are not intended to be limiting.

The processor 26 may include a trusted execution environment (TEE) 26. FIG. 1 illustrates an example of how TEE 30 and processor 26 may interact. For example, processor 26 generally may be embodied as a rich execution environment having open software applications stored in memory and an embedded operating system (OS) stored in memory and executable by processor 26, whereas the TEE 30 may comprise trusted software applications, a trusted operating system (IS), and trusted memory (e.g., the memory may be partitioned in both hardware and software). Trusted software applications may be stored in the trusted memory and may be executed exclusively by the trusted operating system. The trusted software applications may comprise a data privacy system that used private-public key pair, wherein the memory securely stores one or more (cryptographic) private keys and their corresponding public or secondary keys. As described more below, the TEE 30—via processor 26—may process the image data to detect an anomaly, extract the personal data from the image data, and encrypt the personal data with a key that allows decryption of the data only within the backend computer system 14 (e.g., a TEE within the backend computer system described below).

Memory 28 may comprise volatile and/or non-volatile memory devices. Non-volatile memory devices may comprise any non-transitory computer-usable or computer-readable medium, storage device, storage article, or the like that comprises persistent memory (e.g., not volatile). Non-limiting examples of non-volatile memory devices include: read-only memory (ROM), erasable programmable read-only memory (EPROM), electrically erasable programmable read-only memory (EEPROM), optical disks, magnetic disks (e.g., such as hard disk drives, floppy disks, magnetic tape, etc.), solid-state memory (e.g., floating-gate metal-oxide semiconductor field-effect transistors (MOSFETs), flash memory (e.g., NAND flash, solid-state drives, etc.), and even some types of random-access memory (RAM) (e.g., such as ferroelectric RAM). According to one example, non-volatile memory devices may store one or more sets of instructions which may be embodied as software, firmware, or other suitable programming instructions executable by processor(s) 26—including, but not limited to, the instruction examples set forth herein.

Volatile memory devices may comprise any non-transitory computer-usable or computer-readable medium, storage device, storage article, or the like that comprises nonpersistent memory (e.g., it may require power to maintain stored information). Non-limiting examples of volatile memory include: general-purpose random-access memory (RAM), static RAM (SRAM), dynamic RAM (DRAM), or the like.

Communication system 22 may comprise electronic circuitry (and/or programmed/programmable software) to facilitate wired communication, wireless communication, or both. For example, communication system 22 may comprise a wireless chipset for short-range (e.g., Wi-Fi, Bluetooth, etc.) wireless communication or long-range (e.g., cellular, satellite, etc.) wireless communication. Further, communication system 22 may comprise a wired interface having a port so that a trained technician physically may connect a service computer to the port and download protected personal and/or non-personal data from memory 28. Other aspects of communication system 22 also are contemplated herein.

The sensor 24 may refer to one sensor or multiple sensors. The sensor 24 may comprise any suitable electronic hardware which may gather sensor data of its surroundings. Non-limiting examples of sensor 24 are provided above, such as camera configured to generate image or video data, lidar, radar, an infrared camera, a short-, medium-, or long-range thermal imaging sensor, a milli-meter radar sensor, a sonar sensor (e.g., an ultrasonic sensor), etc. As shown, sensor 24 may communicate unsegregated data to computer 20, which in turn may alter the unsegregated data before providing it to communication system 22—e.g., computer 20 may mask the data, may separate the personal data from the non-personal data, may encrypt the data, may execute a combination of these tasks, etc.

Sensor data may refer to any suitable image data, a plurality of data points of a lidar sensor, a plurality of data points of a millimeter radar sensor, a plurality of data points of a sonar sensor, a plurality of data points of a thermal image, or the like. Image data may refer to digital images of a digital camera sensor, elements of digital images (e.g., pixels or groups of pixels), a frame of video, or the like. Non-personal data may be embodied in sensor data, and personal data may be embodied in image data and some other forms of sensor data.

The local computer system 12 may communicate with the backend computer system 14 via a wired and/or wireless communication network 40. The backend computer system 14 may communicate with other backend computer systems 14 or other computer systems described herein via the communication network 40. Communication network 40 may comprise public or private telephony infrastructure, cable communication infrastructure, cellular tower and base station infrastructure, satellite and satellite base station infrastructure, and/or the like.

According to one example, the backend computer system 14 comprises one or more processors 42, storage 44 and memory 46. The processor(s) 42 may be similar to processor 26, described above; therefore, this hardware will not be re-described in detail for sake of brevity. At least some of the instructions executed by processor(s) 42 may differ from those executed by processor(s) 26—as will be illustrated in the flow diagrams which follow. The processor 42 may have a TEE 48, also referred to as a backend TEE. The TEE 48 and processor 42 may interact as similarly described above. For example, processor 42 may be embodied as a rich execution environment having open software applications and an embedded operating system (OS), whereas TEE 48 may comprise trusted software applications, a trusted operating system (OS), and trusted memory (e.g., memory which may be partitioned in both hardware and software). In one embodiment, the processor 42 may execute instructions stored in memory 46, while the TEE comprises separate trusted memory separate from memory 46.

Storage 44 may store a database of information relating to objects for comparison with the image data sensed by the image sensor 24. For example, if the image sensor 24 is a camera configured to generate visible-light images of people, the storage 44 may include an associated database of personal data (e.g., faces, etc.) of authorized or unauthorized people. The processor 42 may access this database in the storage 44 to compare the decrypted personal data originating from the sensor 24 with the stored personal data in the database. In embodiments, the database in storage 44 is trusted memory such that it can only be accessed by TEE 48 to allow the TEE 48 to perform the comparison between the decrypted personal data and the stored personal data.

The backend computer system 14 may also rely on a Multi-Party Computation (MPC) framework with multiple computers for masking computation of personal data. In an embodiment, at least a first input (e.g., one or more random masks) from one of the computers is received, at least a second input (e.g., one or more random masks) from a second (different) computer is received, and the masking computation uses the first and second inputs to determine an output (e.g., shares of masked data), wherein each of the first and second computers receive an output (e.g., the first computer receives a first portion of a set of shares of masked data and the second computer receives a different, second portion of the set of shares of masked data, wherein the shares of the first portion may be exclusive of the shares of the second portion). According to this framework, the first computer cannot decipher the original personal data without the share(s) of the second computer (which it does not have), or vice-versa. Thus, any data breach (e.g., due to a malicious attack) cannot decipher the personal data of the first computer (even if the data breach includes acquiring the shares of the first computer). The data is similarly protected if a data breach of the second party occurs. It should be appreciated that parties to an MPC framework themselves cannot access the data without consent among all or a quorum of the parties that this should be allowed. Accordingly, the use of the MPC framework can be compliant with GDPR or CCPA.

While not shown in FIG. 1, the backend computer system 14 can communicate with an additional computer system for generating or issuing an alert based on the comparison between the decrypted personal data and the stored personal data. This additional computer system may be, for example, a surveillance computer system with a user interface (e.g., computer screen, speakers, microphone, etc.) allowing the user to interface with the computer system. In one embodiment, the user interface allows an employee or operator of the surveillance system to be informed (e.g., with visual or audible alerts) of the detected anomaly, such as a certain person being in an unauthorized area. In embodiments, the alerts can be audible (e.g., siren or other noise), visual (e.g., lights, flashes, messages on an electronic device, etc.), or haptic (e.g., vibration) generated by the additional computer system. In other embodiments, the alert can be or include an action, such as locking doors, or closing and/or locking fire doors in, for example, a hospital.

Figure 2:
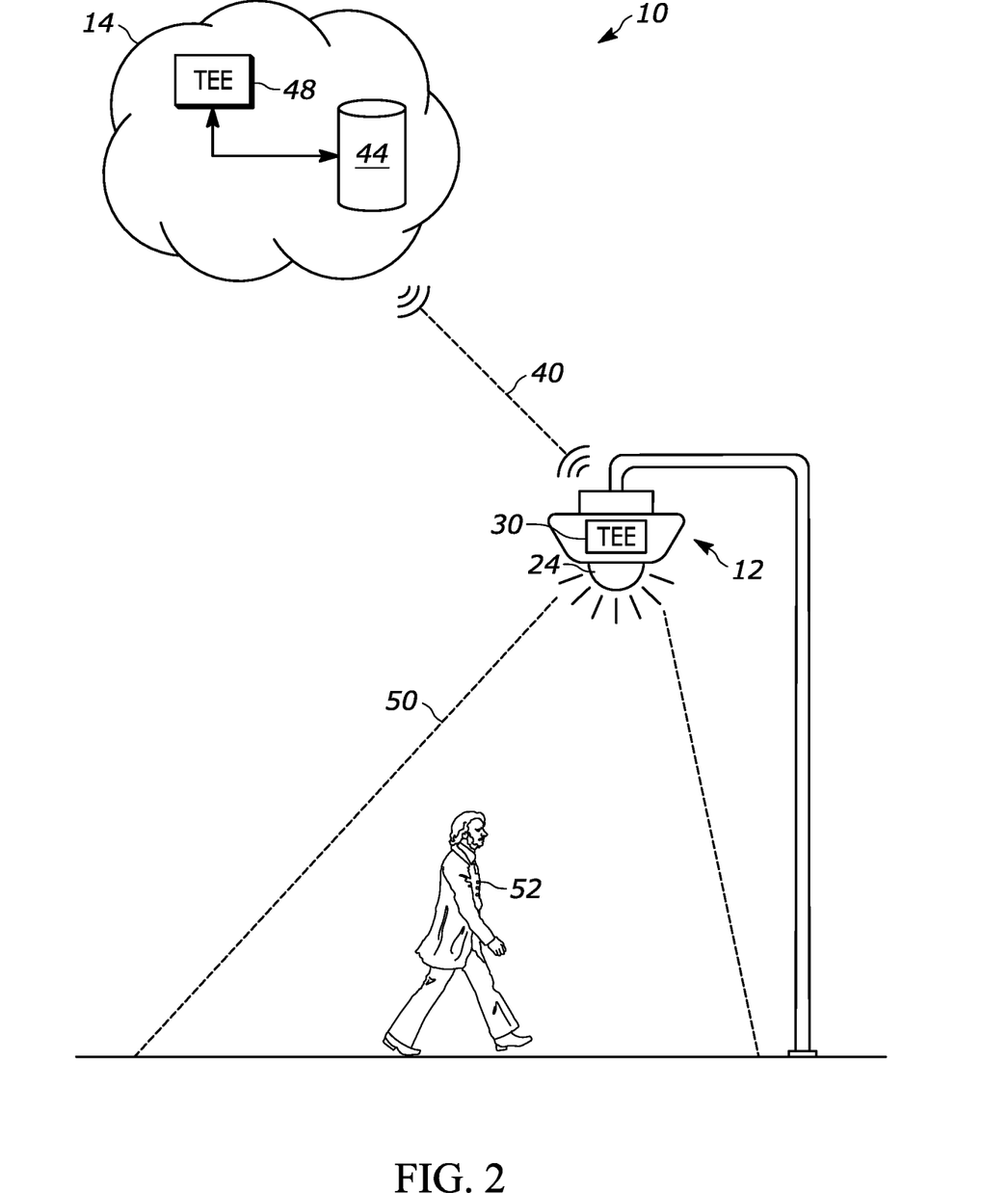
FIG. 2 is another illustration of the data privacy system, according to an embodiment.

FIG. 2 shows an embodiment of the data privacy system 10 in use. In this embodiment, the sensor 24 of the local computer system 12 has a field of view 50 allowing the sensor 24 to detect an anomaly such as a person 52 moving in the field of view 50. For example, the sensor 24 can be a camera, and the local TEE 30 is utilized to detect an anomaly by processing the images captured by the camera. In embodiments, the anomaly is determined by the mere presence of a person 52 in the field of view; in other embodiments, the anomaly is determined when an object (e.g., the person 52) moving at a certain speed, in a certain direction, or the like. Many other examples are contemplated, and this disclosure is not intended to be limited to a specific anomaly detection unless otherwise stated. For example, the anomaly can be determined based on a presence of a person in the field of view 50 at a specific time, the presence of a rapidly moving object or person (e.g., greater than a speed threshold), the presence of a person in the field of view 50 for a time exceeding a time threshold, or unusual movement patterns of a person in the field of view 50 (e.g., unusual changes of direction, a motionless person, a person touching or interacting with other objects such as a door or fence, etc.). The anomaly may also be determined based on furtive movement, e.g., movement that is determined to be outside the normal expected movement. The determination of furtive movement being present may be based off of a machine-learning model that compares the detected movement to a database of movements, and relies on a trained model to determine if such a movement is furtive or not (e.g., deviating from the normal, expected motion of a human). If the TEE 30 detects an anomaly, it extracts personal data from the images, encrypts the personal data, and causes it to be sent to the backend computer system 14 via communication network 40 where the backend TEE 48 can decrypt the images and process them by comparing them to the stored images (and/or the data associated with those stored images) in an image database 44 to see if there is match between the decrypted images and the images in the database 44. It should be understood that the comparison of the decrypted images and the images in the database 44 does not necessarily require the transfer and comparison of the images themselves (e.g., faces), but can be performed using data extracted from the images (e.g., coordinates of eyes, nose, mouth, etc.).

Figure 3:
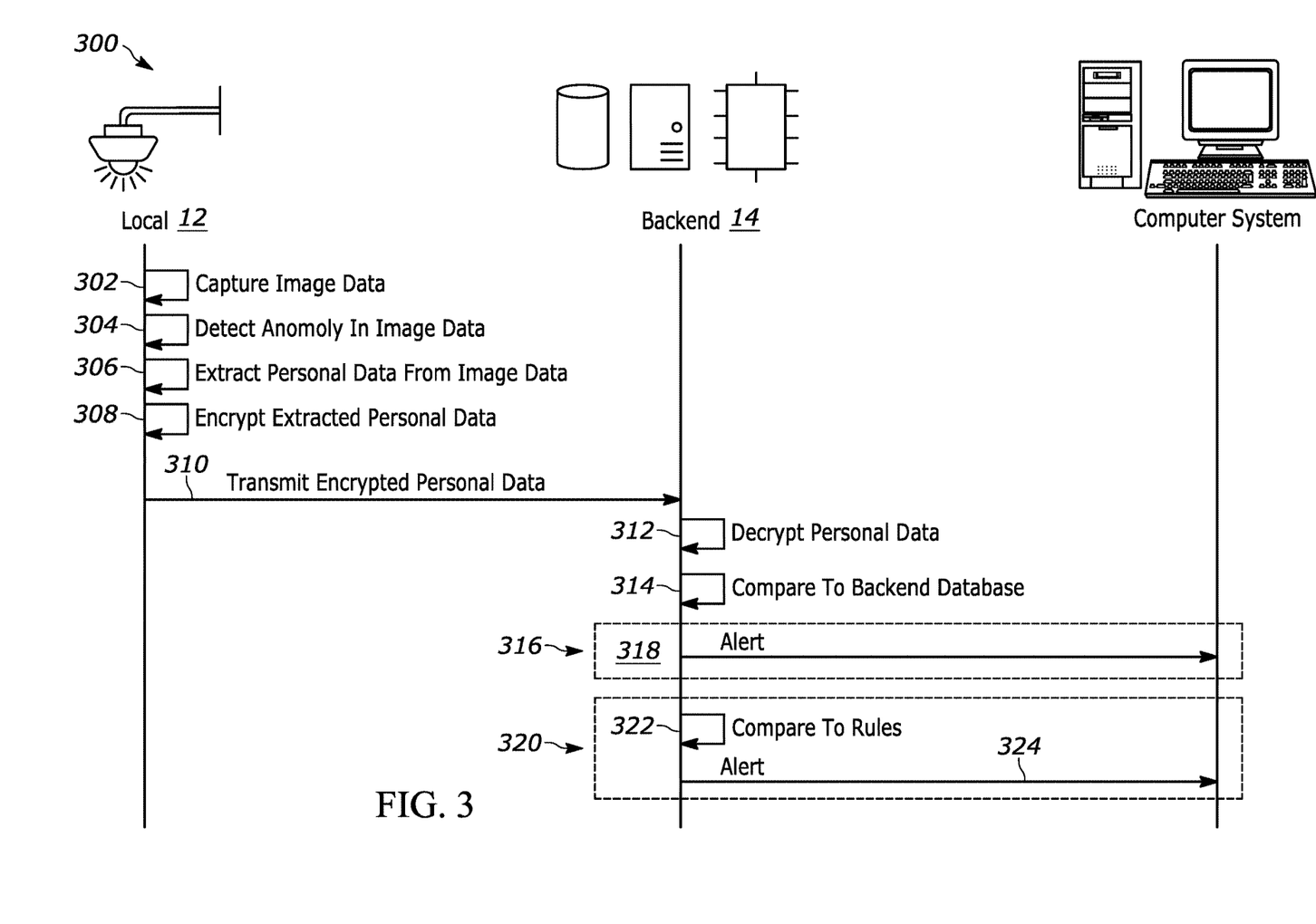
FIG. 3 is a flow diagram illustrating a process of using the data privacy system, according to an embodiment.

Turning now to FIG. 3, a process 300 is shown illustrating collecting sensor data using local computer system 12, whereby personal data is protected both at the local computer system 12 and the backend computer system 14. The process 300 may be performed using the structure of the local computer system 12 and backend computer system 14 described with reference to FIG. 1. The steps described below can be performed by one or more processors, such as processor 30 (for local processing) and processor 42 (for backend processing).

In block 302, image data is captured by sensor 24 at the local computer system 12. As explained above, the image data may be visible light images captured by the sensor 24 which is a camera. Other embodiments are contemplated and described above where the image data is a plotting of points corresponding to lidar data, for example. The image data is the data associated with the image, such as color, coordinates of objects or persons, shading, and the like.

In block 304, an anomaly is detected in the image data. This may be performed by the TEE 30 of the local computer system 12, for example. The image data may be sent directly to the TEE 30 for such anomaly detection. In this embodiment, the TEE 30 accesses trusted memory which allows the TEE 30 to process the image data according to instructions that allow the TEE 30 to determine an anomaly. Execution of the inference tasks within the TEE 30 protects the image data from disclosure to, and manipulation by, unauthorized parties. As explained herein, the anomaly may be a detection of an object, an object moving at a certain speed, etc.

The processor 26 (specifically, the TEE 30) may be configured to utilize any suitable algorithm to detect anomalies in images. Machine learning can also be relied upon, utilizing algorithms such as Isolation forest, or Robust Random Cut Forest (RRCF), just to name a few.

In block 306, in the event the anomaly is detected, the personal data can be extracted from the image or image data that caused the anomaly detection. This may be performed by the TEE 30 at the local computer system 12, for example. As described above, this may include facial features, names, license plates, gate, fingerprints, other biometric data, or the like. Block 306 may include several additional or optional steps, such as identification of certain images that feature particularly good quality, lighting, or other desirable properties that allow optimum extraction of the personal data.

In the event no personal data can be extracted, the local computer system 12 can cause an alert to be raised regarding the detection of an anomaly. The alert may be one of those described herein, such as an audible alert, visual alert, message to a user or system controller or administrator, or the like. Alternatively, some other predefined action may be taken, such as secure storage of the image data for later analysis. The secure storage of such image data can be done locally, i.e. within storage within the local computer system 12. For example, video footage of the anomaly can be stored locally within a local storage device connected to the processor 26.

If personal data can be extracted, the local computer system 12 (e.g., via communication system 22) establishes a mutually authenticated secure connection with the backend computer system 14, ensuring integrity and confidentiality to the backend computer system 14. In one embodiment, this is performed using Transport Layer Security (TLS). Other cryptographic protocols are contemplated.

In block 308, the extracted personal data is encrypted (e.g., by the TEE 30) to prepare the personal data to be transmitted to the backend computer system 14. As explained herein, the extracted personal data may be encrypted within the TEE 30 using a key that allows decryption of the data only within the backend TEE 48. Alternatively, this step may be omitted if the TLS stack utilized for communication is tightly integrated with both communication partners' TEEs.

In block 310, the local computer system 12 transmits the encrypted personal data over the secured connection to the backend computer system 14, where it is transferred to the backend TEE 48.

Programmed functionality within the TEE is performed to decrypt the received encrypted image data (block 312), and to determine whether the received personal data matches with stored personal data (e.g., personal or biometric data stored in an encrypted backend database 44) (block 314). In one embodiment, the backed database 44 is a TEE-protected database, such as an Edgeless Database (EdgelessDB). If there is no match or correspondence between the received encrypted image data received from the local computer system 12 and the encrypted image data stored in the encrypted backend database, the system proceeds to block 316; if there is such match or correspondence, the system proceeds to block 320.

Block 316 includes the backend computer system 14 sending or issuing an alert, shown at block 318. This alert can be outputted by the backend computer system 14 itself, such as by displaying or projecting the alert to a computer, monitor, speaker, screen, etc. connected to the backend system 14. Alternatively, the backend computer system 14 can send a message to the local computer system 12 to issue the alert such that the premises where the object is detected is made aware of the anomaly (e.g., a siren or light made to an intruder). Alternatively, in the illustrated embodiment of FIG. 3, the backend computer system 14 issues a message or sends an alert to another computer system such that a human or machine operator can be made aware of the anomaly and appropriate action can be taken. While not illustrated, other steps can be taken in block 316, such as secure storage of the image data (e.g., storing video footage within database 44) for later analysis.

At block 320, if a match at 314 is determined to be present, the backend computer system 14 can retrieve a set of rules associated with the identified personal data for comparison at 322. The rules may be stored in storage 44 or memory 46. The rules may be time based, location based, and/or specific to the identified individual. An example of such a rule may be—if the image data was timestamped at a particular time and the identified person is in a forbidden area, then there is no alert, but the person's presence in that location and time is flagged or otherwise documented. Said another way, "IF (time in [00:00, 6:00]) AND (subject in [geodata of forbidden area]) THEN no alert, but document subject's presence. In comparison, a related set of rules might say "IF (time in [6:00, 8:00]) AND (subject in [geodata of forbidden area]), THEN alert. In this particular rule, the only difference is the time, which causes an alert to be issued; the person may be forbidden to be in the particular area between the hours of 6:00 and 8:00, but otherwise allowed in the area, and thus the alert is issued in this example.

The local computer system 12 and associated rules may be configured with location-based analysis such that even though the object or person might be in the field of view of the sensor 24, the rules do not yield an alert unless the person enters a certain area of the field of view smaller than the entire field of view.

If no such rules can be found (e.g., there are no rules matching the particular person in a particular location at a particular time), the backend computer system 14 can perform a default action. For example, the alert similar to block 318 may be raised.

At block 322, if a certain rule calls for an alert to be sent, the alert can be made similar to block 318. Alternatively, another output other than the alert may be made in response to one or more of the rules being satisfied, as dictated by the rules.

Figure 4:
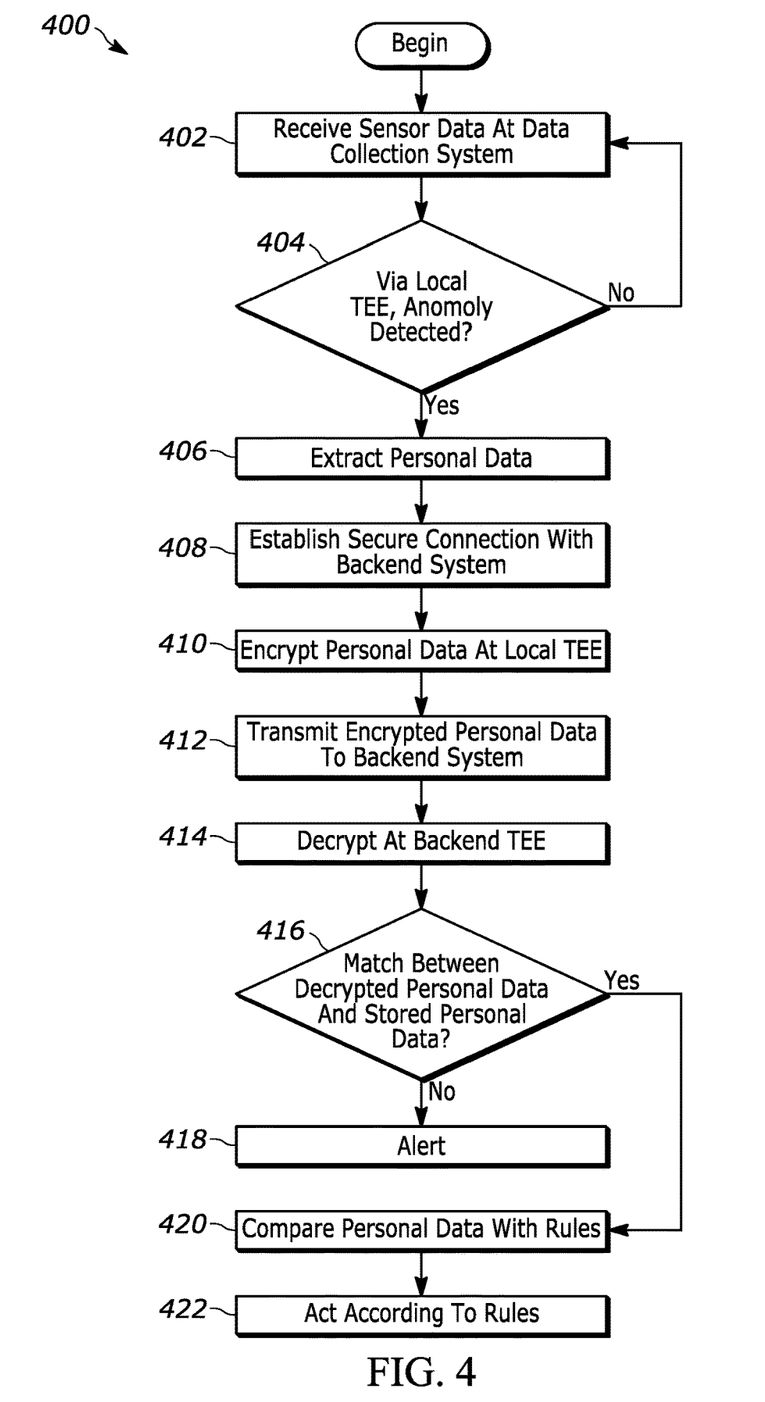
FIG. 4 is another flow diagram illustrating a process of using the data privacy system, according to an embodiment.

Referring to FIG. 4, a method for utilizing the local computer system 12 and backend computer system 14 to protect personal data is disclosed. These steps may be used in conjunction with or in the context of the structure described above with respect to FIGS. 1-2.

At 402, the local computer system 12, also referred to as a data collection system, collects or receives sensor data. For example, the sensor 24 can be utilized to collect image data as described above. At 404, the TEE 30 within the local computer system 12 determines if an anomaly is present, according to the teachings above. If no anomaly is detected, the method returns to 402.

If an anomaly is detected, then the TEE 30 extracts personal data at 406, and establishes a secure connection with the backend computer system 14 at 408. The personal data may be encrypted by the TEE 30 at 410. At 412, the local computer system 12 (via communication system 22) transmits the encrypted personal data to the backed computer system 14.

Once the backend computer system 14 receives the (encrypted) personal data, the TEE 48 at the backend computer system 14 can decrypt the personal data at 414. At 416, the TEE 48 determines if there is a match between the decrypted, received personal data and the personal data stored in memory (e.g., database 44). If there is no such match, then an alert may be output at 418. If there is such a match, the backend computer system 14 (e.g., backed TEE 48) can rely on trusted storage to compare the personal data to a set of rules at 420, which can dictate how the system acts at 422. For example, the system may output an alert, securely store the image data or associated personal data, or perform other actions as required by the rules.

It should be appreciated that aspects of any of the processes described herein may be used with one another to promote data privacy and compliance with data privacy regulations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computerized method of managing personal data associated with image processing, the computerized method comprising:
    capturing an image of an individual via an image sensor;
    detecting an anomaly in the image via a local computer system local to the image sensor;
    in response to the anomaly being detected, extracting personal data from the image via the local computer system;
    establishing a secure connection between the local computer system and a backend computer system;
    encrypting the personal data via the local computer system to produce encrypted personal data at the local computer system;
    transmitting the encrypted personal data to the backend computer system via the secure connection;
    decrypting the encrypted personal data via the backend computer system to produce decrypted personal data at the backend computer system; and
    performing, via the backend computer system, data processing based on a comparison of the decrypted personal data and stored personal data stored in the backend computer system.

2. The computerized method of claim 1, further comprising:
    in response to the decrypted personal data not being associated with the stored personal data, outputting an alert associated with a presence of the personal data.

3. The computerized method of claim 1, further comprising:
    in response to the decrypted personal data not being associated with the stored personal data, storing the decrypted personal data in a secure database.

4. The computerized method of claim 1, further comprising:
    in response to the decrypted personal data being associated with the stored personal data, acting according to a set of rules associated with the decrypted personal data.

5. The computerized method of claim 4, wherein the set of rules includes rules relating to a permitted location-based access of a person identified by the decrypted personal data.

6. The computerized method of claim 5, wherein the acting according to the set of rules includes outputting an alert in response to the identified person being unauthorized to be within a restricted location associated with a location of the image sensor.

7. The computerized method of claim 5, wherein the acting according to the set of rules includes outputting an alert in response to the identified person being unauthorized to be within a location during a certain time.

8. A system of managing personal data associated with image processing, the system comprising:
    an image sensor configured to capture an image;
    a local computer system local to the image sensor, the local computer system including a processor having a first trusted execution environment (TEE) programmed to (i) detect an anomaly in the image, and (ii) in response to detecting the anomaly, extracting personal data from the image to yield extracted personal data;
    a backend computer system remote from the image sensor, the backend computer system including a database of stored personal data coupled to a processor having a second trusted execution environment (TEE) configured to (i) receive the extracted personal data, and (ii) perform data processing based on a comparison of the extracted personal data and the stored personal data.

9. The system of claim 8, wherein the first TEE is configured to encrypt the personal data from the image using a key that allows decryption of the personal data only within the second TEE.

10. The system of claim 8, wherein the backend computer system is configured to, in response to the extracted personal data not being associated with the stored personal data, output an alert associated with a presence of the personal data.

11. The system of claim 8, wherein the backend computer system is configured to, in response to the extracted personal data not being associated with the stored personal data, store the decrypted personal data in a secure database.

12. The system of claim 8, wherein the backend computer system is configured to, in response to the extracted personal data being associated with the stored personal data, act according to a set of rules associated with the extracted personal data.

13. The system of claim 12, wherein the set of rules includes rules relating to a permitted location-based access of a person identified by the extracted personal data.

14. The system of claim 13, wherein the act according to the set of rules includes outputting an alert in response to the identified person being unauthorized to be within a restricted location associated with a location of the image sensor.

15. The system of claim 13, wherein the act according to the set of rules includes outputting an alert in response to the identified person being unauthorized to be within a location during a certain time.

16. A security system configured to manage personal data associated with image processing, the security system comprising:
    an image sensor configured to capture an image;
    a database remote from the image sensor and storing stored personal data;
    a first processor local to the image sensor and having a first trusted execution environment (TEE) programmed to:
        receive image data corresponding to the image captured by the image sensor,
        detect an anomaly in the image data, in response to detecting the anomaly, extract personal data from the image, and encrypt the extracted personal data with a key; and a second processor remote from the image sensor and coupled to the database, the second processor having a second trusted execution environment (TEE) programmed to:

decrypt the encrypted personal data with the key from the first TEE, and perform data processing based on a comparison of the decrypted personal data and the stored personal data.

17. The security system of claim 16, wherein the second processor is programmed to:

in response to the decrypted personal data not being associated with the stored personal data, output a signal to (i) close a door, (ii) lock a door, or (iii) sound an audible alarm.

18. The security system of claim 16, wherein the second processor is programmed to:

in response to the decrypted personal data not being associated with the stored personal data, store the decrypted personal data in a secure database.

19. The security system of claim 16, wherein the second processor is programmed to:

in response to the decrypted personal data being associated with the stored personal data, act according to a set of rules associated with the decrypted personal data.

20. The security system of claim 19, wherein the set of rules includes rules relating to a permitted location-based access of a person identified by the decrypted personal data.

* * * * *